(12) United States Patent
Gutierrez-Wolf et al.

(10) Patent No.: US 8,521,335 B2
(45) Date of Patent: Aug. 27, 2013

(54) GRAY WATER RECYCLING APPARATUS AND METHOD

(75) Inventors: Magdalena M. Gutierrez-Wolf, San Diego, CA (US); Charles A. Wolf, San Diego, CA (US)

(73) Assignees: Magdalena M. Gutierrez-Wolf, San Diego, CA (US); Charles A. Wolf, San Diego, CA (US)

( * ) Notice: Subject to any disclaimer, the term of this patent is extended or adjusted under 35 U.S.C. 154(b) by 324 days.

(21) Appl. No.: 12/881,291

(22) Filed: Sep. 14, 2010

(65) Prior Publication Data

US 2012/0060932 A1 Mar. 15, 2012

(51) Int. Cl.
*G05D 7/00* (2006.01)
(52) U.S. Cl.
USPC .................................. 700/282; 700/9; 700/17

(58) Field of Classification Search
USPC ........................................................ 700/282
See application file for complete search history.

(56) References Cited

U.S. PATENT DOCUMENTS

| | | | | |
|---|---|---|---|---|
| 6,132,138 A * | 10/2000 | Haese | ............................. | 405/37 |
| 2001/0004962 A1* | 6/2001 | Hirota et al. | ............... | 204/228.1 |
| 2005/0022292 A1* | 2/2005 | Choi | ................................ | 4/300 |
| 2005/0098225 A1* | 5/2005 | Chantalat | ........................ | 141/64 |

* cited by examiner

*Primary Examiner* — Carlos Ortiz Rodriguez
(74) *Attorney, Agent, or Firm* — John L. Rogitz

(57) ABSTRACT

Instead of disposing gray water with sewage water, a gray water recycling apparatus uses a series of sensors and determines the acceptability of chemical concentrations and temperature of the gray water for use in irrigation purposes so as to ensure the recycled gray water is safe for irrigation. If it is, a three-way valve is positioned to direct the gray water to an irrigation pipe; otherwise, the three-way valve is positioned to direct the water to a public sewage system or septic tank.

19 Claims, 2 Drawing Sheets

GRAY WATER RECYCLING APPARATUS AND METHOD

FIELD OF THE INVENTION

The present invention relates generally to an apparatus that diverts gray water from a washing machine to landscape or a sewer drain based on analysis from sensors.

BACKGROUND OF THE INVENTION

In many climates around the world, especially those that are arid, water conservation and water recycling are important tools in mitigating the problem of limited fresh water resources. As understood herein, fresh water can be conserved by using household wastewater, known as "gray water", which can come from household effluent drains. As also understood herein, however, the amount of impurities and turbidity of the gray water can in part affect the type of application and ability for reclamation and gray water's use in recycling.

Present principles further recognize the desirability of eliminating costly components such as sump pumps from reclamation systems. It is also desirable according to present principles to reduce the risk of blockage and clogging such as might be encountered in recycling devices that integrate with pre-existing irrigation facilities, such as drip lines, sprinkler heads etc.

A critical recognition is that gray water may contain harmful constituents that can be toxic to plants, inhibit seed-germination, and destroy the structure of clay soils. Present principles recognize that the identification and removal of substances within gray water can prove to be beneficial in determining whether said gray water is suitable for use in irrigation systems.

SUMMARY OF THE INVENTION

As understood herein, there is a need for a method and apparatus that allows a typical household to identify, reclaim, and recycle gray water without expensive remodeling of existing structures, and intensive construction installation.

Accordingly, in one aspect an apparatus includes an electrically-positioned three way diverter valve having an inlet in fluid communication with an effluent (e.g., gray water) line (e.g., pipe) of a household appliance (e.g., a washing machine), a sewer outlet in fluid communication with a public sewage system, and an irrigation outlet in fluid communication with an irrigation pipe. The three-way diverter valve may have a sewer position wherein the inlet is in fluid communication with the sewer outlet and an irrigation position wherein the inlet is in fluid communication with the irrigation outlet. In example embodiments the diverter valve is positioned in the effluent pipe substantially at about the same height, e.g., within six to eight vertical inches, as the effluent outlet port of the appliance to minimize stress on a pump motor that may be associated with the appliance.

At least one sensor senses at least one characteristic of effluent from the household appliance and at least one processor receives signals from the sensor and responsive thereto establishing a position of the three-way valve. At least one characteristic of the effluent may include temperature and/or a predetermined chemical. Additionally, the processor may include receiving and transmitting a signal to and/or from a mobile communication device. The processor may execute logic to receive a signal from the mobile communication device and use the signal from the mobile communication device, along with the signals received from at least one sensor that senses at least one characteristic of effluent from the household appliance, to establish and relay back to the mobile device, e.g., the current status of at least one characteristic of the effluent and/or the position of the three-way valve. The processor may further execute logic to electrically control the position of the three-way valve based on signals received from a mobile communication device.

Without limitation, a sensor may include a temperature sensor with the irrigation position established responsive to a determination that temperature of the effluent is no more than a threshold temperature. Likewise, a sensor may also include, in addition to or in place of a temperature sensor, a chemical sensor that senses a concentration of a predetermined chemical in the effluent and the irrigation position is established responsive to a determination that the concentration of the predetermined chemical in the effluent is no more than a threshold concentration. The irrigation position may be established responsive to both a determination that the concentration of the predetermined chemical in the effluent is no more than a threshold concentration and also responsive to a determination that temperature of the effluent is no more than a threshold temperature. The predetermined chemical includes chlorine. The threshold concentration includes 200 p.p.m. (parts per million) or approximately 5.25 percent per gallon of effluent. The threshold temperature includes 145 degrees Fahrenheit (approximately 62.7 degrees Celsius).

The apparatus may further include a check valve and/or an anti-siphon valve in the irrigation pipe to permit only one-way flow from the three-way valve through the irrigation pipe and/or include a particulate filter in the irrigation pipe to filter particulate matter in the effluent. The apparatus may also include a volumetric flow meter to display and measure average effluent fluid flow rates, and/or volumetric effluent fluid values for momentary, and/or accumulative (total volume units) usage totals. The household appliance may be a washing machine that includes a pump, which in example embodiments can supply approximately thirty pounds per square inch to thirty five pounds per square inch (30 p.s.i. to 35 p.s.i.) of effluent fluid pressure to a horizontal radius of up to and including one hundred feet. Effluent pressure in an effluent pipe of, e.g., an inch in diameter, may be measured.

In another aspect, a method includes receiving at least one signal representing a predetermined characteristic of effluent (e.g., gray water) from a household appliance (e.g., a washing machine), and based at least in part on the signal, positioning a valve to divert the effluent to a public sewage system or to an irrigation pipe. The valve may be manually and/or electrically positioned. The predetermined characteristic includes temperature and/or a chemical concentration. The chemical concentration includes a chlorine concentration. The chlorine concentration may have a threshold concentration, which includes 200 p.p.m. (parts per million) or approximately 5.25 percent per gallon of effluent. The temperature may have a threshold temperature, which includes 145 degrees Fahrenheit (approximately 62.7 degrees Celsius).

In another aspect, an assembly includes a three-way valve having an inlet in fluid communication with an effluent (e.g., gray water) line (e.g., pipe) of a household appliance (e.g., a washing machine), a sewer outlet in fluid communication with a public sewage system, and an irrigation outlet in fluid communication with an irrigation pipe. The three-way valve includes having a sewer position wherein the inlet is in fluid communication with the sewer outlet and an irrigation position wherein the inlet is in fluid communication with the irrigation outlet. The three-way valve may additionally include at least one indicator light having a first visual appearance when the three way valve is in the sewer position and a second visual appearance when the three way valve is in the irrigation position. An indicator light includes a light emitting diode (LED). A first visual appearance may include e.g., a blinking LED, and/or a change in LED color, and/or a change in illuminating light intensity. A second visual appearance may include e.g., a blinking LED, and/or a change in LED color, and/or change in illuminating LED light intensity.

The assembly may further include at least one sensor sensing at least one characteristic of effluent from the household appliance, and at least one processor receiving signals from the sensor and responsive thereto establishing a position, of the three-way valve. At least one characteristic of the effluent may include temperature and/or a predetermined chemical. Without limitation, a sensor includes a temperature sensor and the irrigation position is established responsive to a determination that temperature of the effluent is no more than a threshold temperature. A sensor may also include, in addition to or in place of a temperature sensor, a chemical sensor that senses a concentration of a predetermined chemical in the effluent and the irrigation position is established responsive to a determination that the concentration of the predetermined chemical in the effluent is no more than a threshold concentration. The irrigation position may be established responsive to both a determination that the concentration of the predetermined chemical in the effluent is no more than a threshold concentration and also responsive to a determination that temperature of the effluent is no more than a threshold temperature.

The predetermined chemical includes chlorine. The threshold concentration includes 200 p.p.m. (parts per million) or approximately 5.25 percent per gallon of effluent. The threshold temperature includes 145 degrees Fahrenheit or approximately 62.7 degrees Celsius.

The assembly may further include a check valve and/or an anti-siphon valve in the irrigation pipe to permit only one-way flow from the three-way valve through the irrigation pipe and/or include a particulate filter in the irrigation pipe to filter particulate matter in the effluent. The assembly may also include a volumetric flow meter to display and measure average effluent fluid flow rates, and/or volumetric effluent fluid values for momentary, and/or accumulative (total volume units) usage totals.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
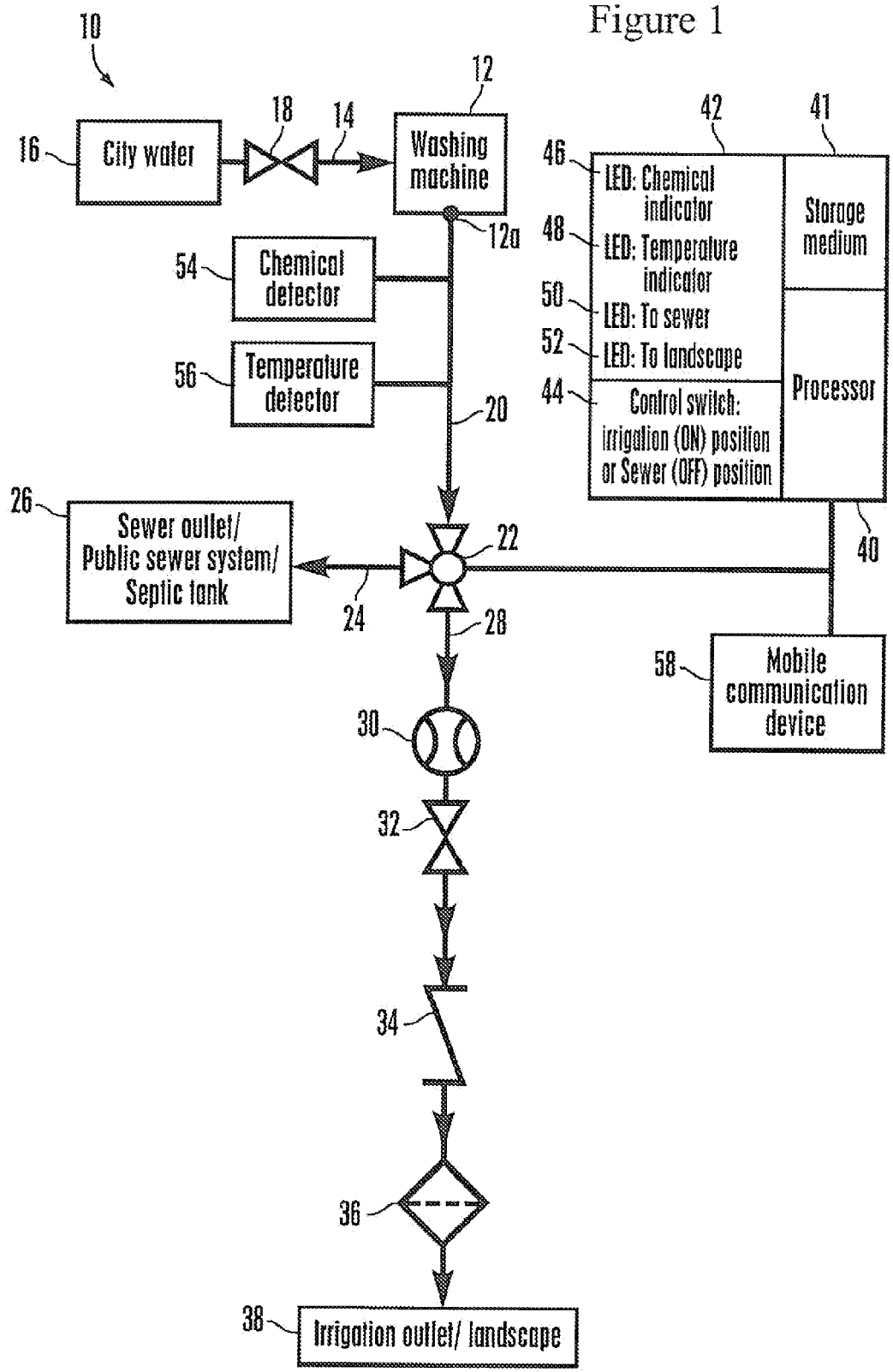
FIG. 1 is a diagram showing an example system in accordance with present principles.

Referring initially to FIG. 1, a system is shown, generally designated 10, which includes a household appliance 12 such as a washing machine, dishwasher (preferably when in a jurisdiction that classifies dishwasher effluent as gray water), or other water-discharging appliance which receives water through an influent pipe 14 from a water source 16 such as a municipal potable water supply. An influent isolation valve 18 may be disposed in the influent pipe 14 to selectively block the influent pipe 14.

As shown, the household appliance 12 has a gray water discharge port 12 in fluid communication with an effluent pipe 20. The effluent pipe 20 is in fluid communication with a three-way diverter valve 22. In some examples the diverter valve 22 is manually operated, but in the embodiment shown the diverter valve 22 is a solenoid valve that is electrically controlled in accordance with principles discussed further below. In example implementations the diverter valve 22 may be a two-position ball valve the position of which is controlled by an electronic and/or hydraulic solenoid responsive to logic set forth further below.

With more specificity and as can be appreciated in reference to FIG. 1, the diverter valve 22 is movable between a sewer position, in which the discharge of the appliance 12 is in fluid communication with a sewage pipe 24 that leads to a sewage system 26 such as a septic tank or public sewer system, and an irrigation position, in which the discharge of the appliance 12 is in fluid communication with an irrigation pipe 28 for purposes to be shortly disclosed. It is preferred that the diverter valve 22 establish fluid communication between the discharge of the appliance and either the sewage pipe 24 or irrigation pipe 28, but not both simultaneously, although in some implementations the diverter valve 22 may be configured to maintain an intermediate position between the sewer position and the irrigation position.

FIG. 1 shows that if desired, a flow meter 30 may be disposed in the irrigation pipe 28 to provide an indication of the existence and/or volume of water flow through the pipe 28. Also, an anti-siphon valve 32 may be disposed in the irrigation pipe 28 downstream of the flow meter 30 to prevent siphoning of fluid through the pipe 28 toward the diverter valve 22. If desired, a check valve 34 may also be disposed in the irrigation pipe 28 downstream of the anti-siphon valve 32 to ensure that fluid may flow through the pipe 28 only away from the diverter valve 22. In some embodiments the check valve 34 may be a swing check-valve that can also serve also as a filter to remove particulates that are too large to pass through the check valve. A clear check-valve with a one inch diameter pipe may be used so that lint and/or other debris can be seen. Also, a filter 36 may also be disposed in the irrigation pipe 28 downstream of the check valve 34 to remove particulate matter from fluid flowing therethrough. The order of components in the irrigation pipe 28 is not limiting.

Downstream of the components in the irrigation pipe 28 is an outlet 38 through which gray water can flow to land surrounding the house in which the appliance 12 is disposed to irrigate the land. While only a single irrigation pipe 28 is shown for clarity it is to be understood that the pipe 28 may be established by multiple pipe segments joined together and may also include branch lines in some examples.

When the diverter valve 22 is solenoid controlled, the solenoid of the diverter valve 28 receives position signals from a processor 40 accessing instructions contained on a non-transitory computer readable storage medium 41 in accordance with logic discussed further below. Without limitation, the storage medium may be embodied by disk-based or solid state storage.

The processor 40 with storage medium 41 may be contained in a control panel assembly 42 which may be integrated with the appliance 12 or housed separately therefrom. In any case, the example control panel assembly 42 may include a control switch 44 which is manipulable to activate or deactivate the logic below. When deactivated, the diverter valve 22 can be in the sewer position.

Additionally, the control panel 42 can include indicator lamps which may be established by light emitting diodes (LED) of various colors. In the embodiment shown, the control panel assembly 42 includes a chemical indicator lamp or display 46 which, when illuminated, indicates that the concentration of a predetermined chemical in the effluent pipe 20 is above (or below) a threshold or which may indicate the numeric concentration. Also, a temperature indicator lamp or display 48 may be provided to indicate temperature of fluid in the pipe 20 or to give a numeric presentation of the temperature. Status lamps 50, 52 may also be provided respectively indicating, when illuminated, that the diverter valve 22 is in the sewer and irrigation positions. The lamps shown in FIG. 1 may also blink or assume differing intensities to indicate various conditions such as overly high temperature in the effluent pipe 20, overly high chemical concentration in the pipe 20, etc.

Completing the description of FIG. 1, various sensors may be in fluid communication with the effluent pipe 20 to communicate signals to the processor 40. In the embodiment shown, a chemical sensor assembly 54 and a temperature sensor assembly 56 are provided which respectively generate signals representative of a chemical concentration and temperature of fluid in the pipe 20. In one example, the chemical sensor 54 is a chlorine sensor. Additional sensors may be provided if desired. Each sensor assembly 54, 56 may include a wired or wireless transmitter that sends signals to the processor 40. The processor 40 may also communicate with a mobile communication device 58 either wired or wirelessly, e.g., to receive control signals from the communication device 58 such as signals activating present logic, deactivating the logic, illuminating one or more lamps for test, etc.

Figure 2:
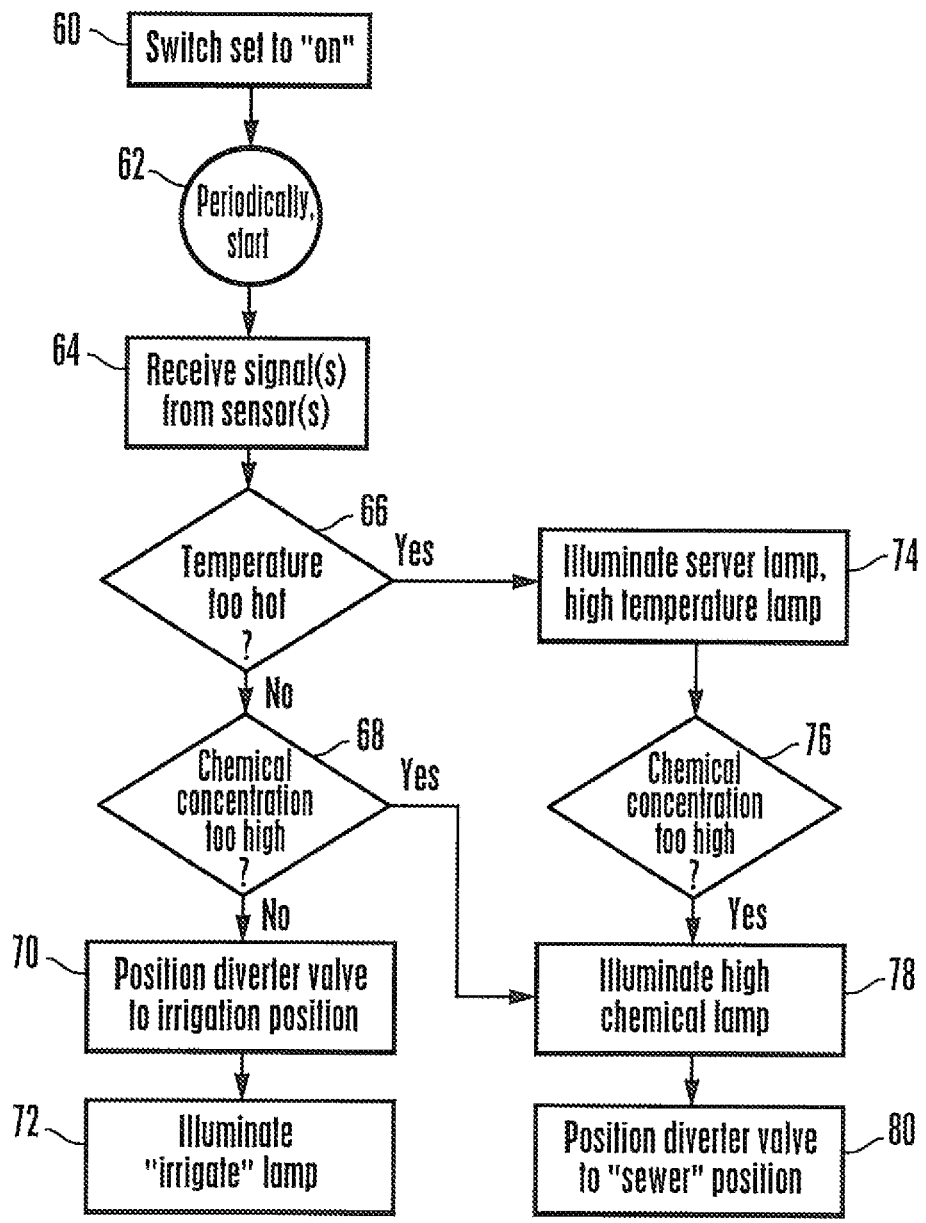
FIG. 2 is a flow chart of logic in accordance with present principles.

FIG. 2 shows example logic in accordance with present principles. Responsive to the control switch 44 being turned to the "on" position at block 60, the logic periodically begins at state 62. Signals from one or more of the sensors 54, 56 are received at block 64. Recall that the signal from the chemical sensor 54 represents the concentration of a particular chemical or chemicals in the effluent from the appliance 12 and the signal from the temperature sensor 56 represents the fluid temperature of the effluent from the appliance 12. In example shown, both temperature and chemical composition in the effluent pipe 20 are tested for, it being understood that only one or the other test may be executed in some embodiments. Also, although FIG. 2 shows that temperature is tested first and then chemical composition, the order of the tests may be reversed.

Proceeding to decision diamond 66, it is determined whether the temperature of fluid in the effluent pipe 20 exceeds a predetermined threshold. In an example non-limiting embodiment the threshold is at least fifty degrees Celsius (50° C.) and more preferably is 62° C. Responsive to a determination that temperature is below the threshold, the logic flows to decision diamond 68 wherein it is determined whether the concentration of the predetermined chemical in the effluent pipe 20 exceeds a threshold concentration. In an example embodiment the chemical is chlorine and an example threshold is two hundred parts per million (200 ppm).

Responsive to a determination that the chemical composition is below the threshold, the logic moves from decision diamond 68 to block 70, wherein the processor 40 causes the diverter valve 22 to be configured (or to remain configured, if already so positioned) in the irrigation position, such that effluent from the appliance 12 is directed to the irrigation pipe 28. Proceeding to block 72, the irrigate lamp 52 is configured (e.g., by keeping it constantly illuminated it or by blinking it on and off) to indicate that the effluent is being directed to landscaping; otherwise, the irrigate lamp is not so configured.

In contrast, responsive to a determination at decision diamond 66 that the temperature of the effluent exceeds the threshold, the logic moves from decision diamond 66 to block 74 to configure the sewer lamp (e.g., by keeping it constantly illuminated or by blinking it on and off) to indicate that effluent is being directed to the sewage system or septic tank. Likewise, the high temperature lamp 48 is configured (e.g., by keeping it constantly illuminated or by blinking it on and off) to indicate that effluent temperature is too high for irrigation.

From block 74 the logic proceeds to decision diamond 76, wherein it is determined whether the concentration of the predetermined chemical in the effluent pipe 20 exceeds the threshold concentration. Positive tests from decision diamonds 76 and 68 cause the logic to flow to block 78, wherein the high chemical lamp 46 is configured (e.g., by keeping it constantly illuminated or by blinking it on and off) to indicate that chemical concentration in the effluent is too high for irrigation. The logic then moves from block 78 to block 80 to configure (or maintain it configured, if already so positioned) the diverter valve 22 in the sewer position. As mentioned above, the logic of FIG. 2 can be periodically repeated.

While the particular GRAY WATER RECYCLING APPARATUS, METHOD, AND ASSEMBLY is herein shown and described in detail, it is to be understood that the subject matter which is encompassed by the present invention is limited only by the claims.

What is claimed is:

1. Apparatus comprising:
   an electrically-positioned three way valve having an inlet in fluid communication with an effluent line of a household appliance, a sewer outlet in fluid communication with a public sewage system, and an irrigation outlet in fluid communication with an irrigation pipe having a pipe outlet through which water can flow to land, the three-way valve having a sewer position wherein the inlet is in fluid communication with the sewer outlet and an irrigation position wherein the inlet is in fluid communication with the irrigation outlet and no holding tank is disposed between the three way valve and the pipe outlet of the irrigation pipe;
   at least one sensor configured for sensing at least one chemical or temperature characteristic of effluent from the household appliance;
   at least one processor configured for receiving signals from the at least one sensor and responsive thereto establishing a position of the three-way valve;
   a control switch manipulable to be in on position or off position;
   the control switch being further configured to communicate with the processor to activate a control logic, when the control switch is in on position;
   the control logic configured to:
   maintain or position the three-way valve to the irrigation position when the at least one chemical or temperature characteristic is within levels for irrigation,
   and maintain or position the three-way valve to the sewer position when the at least one chemical or temperature characteristic is not within levels for irrigation; and
   wherein the three-way valve is configured to be in the sewer position when the control switch is in off position and/or when the control logic is deactivated.

2. The apparatus of claim 1, wherein the at least one sensor is a temperature sensor and the irrigation position is established responsive to a determination that temperature of the effluent is no more than a threshold temperature.

3. The apparatus of claim 1, wherein the at least one sensor is a chemical sensor that senses a concentration of a predetermined chemical in the effluent and the irrigation position is established responsive to a determination that the concentration of the predetermined chemical in the effluent is no more than a threshold concentration.

4. The apparatus of claim 2, further comprising a chemical sensor sensing a concentration of a predetermined chemical in the effluent and the irrigation position is established responsive to a determination that the concentration of the predetermined chemical in the effluent is no more than a threshold concentration and responsive to a determination that temperature of the effluent is no more than a threshold temperature.

5. The apparatus of claim 3, wherein the predetermined chemical is chlorine.

6. The apparatus of claim 1, wherein the household appliance is a washing machine.

7. The apparatus of claim 1, further comprising a check valve in the irrigation pipe to permit only one-way flow from the three-way valve through the irrigation pipe.

8. The apparatus of claim 1, further comprising a particulate filter in the irrigation pipe to filter particulate matter in the effluent.

9. Method, comprising:
receiving from a sensor at least one signal representing a predetermined characteristic of effluent from a household appliance;
based at least in part on the signal indicating that temperature of the effluent is less than a temperature threshold and/or that a chemical concentration in the effluent is less than a concentration threshold, positioning a valve to divert the effluent to an irrigation system such that the effluent flows to land without passing through a holding tank, and responsive to the signal indicating that temperature of the effluent is not less than a temperature threshold and/or that a chemical concentration in the effluent is not less than a concentration threshold, positioning the valve to divert the effluent to a public sewage system, the method further comprising:
receiving a signal representing manipulation of a control switch to be in on position or off position;
using the signal from the control switch to determine whether to activate a control logic, when the control switch is in on position;
wherein the control logic maintains or positions the valve to the irrigation position when at least one temperature or chemical characteristic is within levels for irrigation;
the control logic maintaining or positioning the valve in sewer position when the control switch is in off position and/or when the control logic is deactivated and/or when the temperature or chemical characteristic is not within levels for irrigation.

10. The method of claim 9, wherein the valve is electrically positioned.

11. The method of claim 9, wherein the predetermined characteristic is temperature.

12. The method of claim 9, wherein the predetermined characteristic is a chemical concentration.

13. The method of claim 11, wherein the signal is a first signal representing the temperature and the method further includes receiving from a second sensor a second signal representing a chemical concentration and the control logic maintains the valve in the irrigation position only when both the temperature and the chemical concentration are within levels for irrigation.

14. The method of claim 12, wherein the chemical concentration is a chlorine concentration.

15. Assembly comprising:
a three way valve having an inlet in fluid communication with an effluent line of a household appliance, a sewer outlet in fluid communication with a public sewage system, and an irrigation outlet in fluid communication with an irrigation system, the three-way valve having a sewer position wherein the inlet is in fluid communication with the sewer outlet and an irrigation position wherein the inlet is in fluid communication with the irrigation outlet; and
at least one indicator light having a first visual appearance when the three way valve is in the sewer position and a second visual appearance when the three way valve is in the irrigation position, wherein a control switch is manipulable to be in on position or off position;
the control switch being further configured to activate a control logic, when in on position;
wherein at least one sensor senses at least one chemical or temperature characteristic of effluent flowing through the effluent line;
the control logic being configured to:
maintain or position the three way valve to the irrigation position when the at least one chemical or temperature characteristic is within levels for irrigation,
and maintain or position the three-way valve to the sewer position when the chemical or temperature characteristic is not within levels for irrigation;
wherein the three-way valve is configured to be in sewer position when the control switch is in off position and/or when the control logic is deactivated.

16. The assembly of claim 15, further comprising:
at least one processor receiving signals from the at least one sensor and responsive thereto establishing a position of the three-way valve.

17. The assembly of claim 16, wherein the at least one sensor is a temperature sensor and the irrigation position is established responsive to a determination that temperature of the effluent is no more than a threshold temperature.

18. The assembly of claim 16, wherein the at least one sensor is a chemical sensor that senses a concentration of a predetermined chemical in the effluent and the irrigation position is established responsive to a determination that the concentration of the predetermined chemical in the effluent is no more than a threshold concentration.

19. The assembly of claim 18, wherein the predetermined chemical is chlorine.

* * * * *